UNITED STATES PATENT OFFICE.

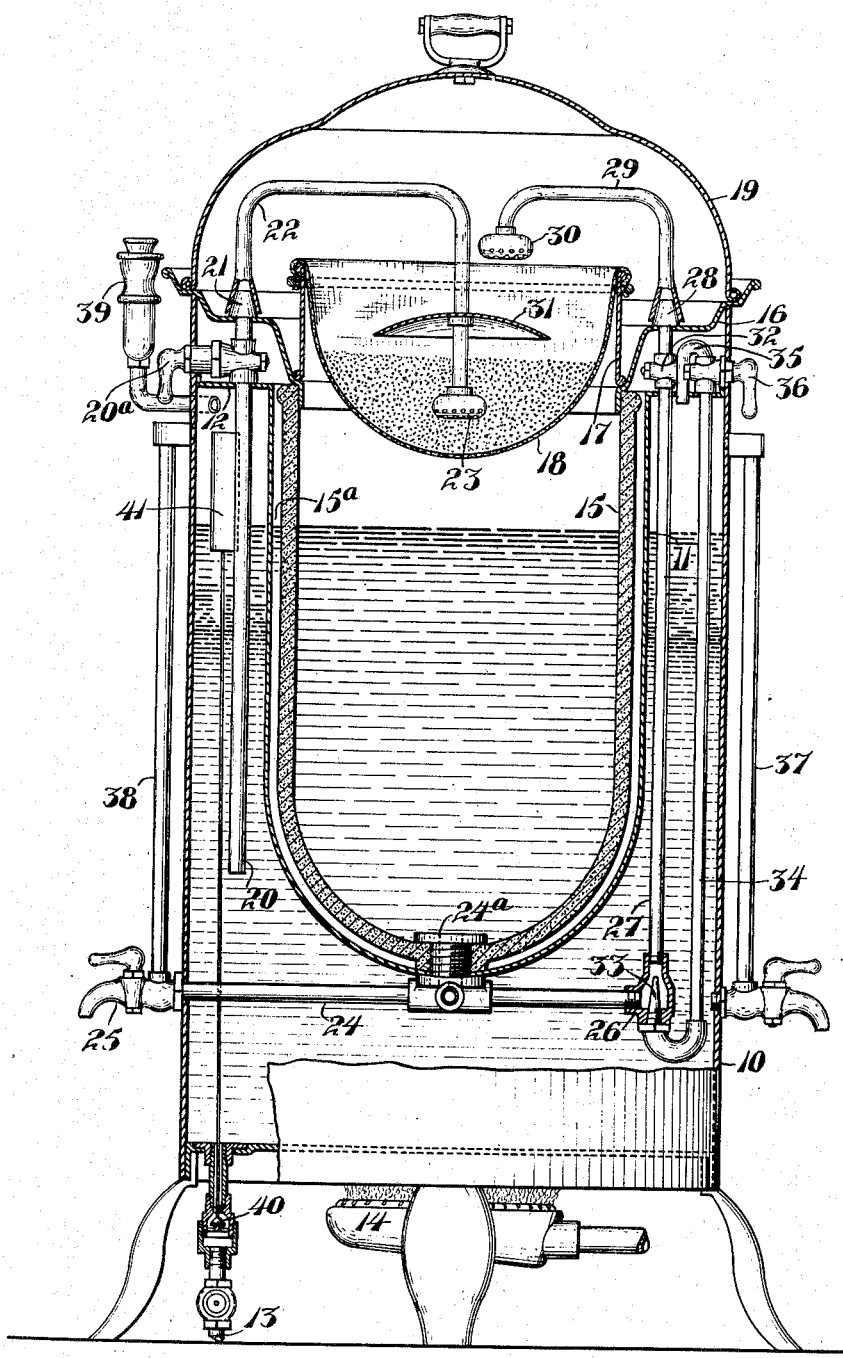

OTIS A. KITTINGER, OF SAN FRANCISCO, CALIFORNIA, ASSIGNOR TO SAN FRANCISCO COFFEE URN COMPANY, OF SAN FRANCISCO, CALIFORNIA, A CORPORATION OF CALIFORNIA.

BEVERAGE-URN.

1,300,175.　　　　Specification of Letters Patent.　　Patented Apr. 8, 1919.

Application filed October 29, 1917.　Serial No. 198,946.

*To all whom it may concern:*

Be it known that I, OTIS A. KITTINGER, a citizen of the United States, residing at the city and county of San Francisco and State of California, have invented new and useful Improvements in Beverage-Urns, of which the following is a specification.

This invention relates to beverage urns with special reference to the type shown and described in Patent No. 1,179,011 to Kittinger and Topper, dated April 11th, 1916, and has for its object to simplify and improve the construction and operation of such devices.

One form which my invention may assume is exemplified in the following description and illustrated in the accompanying drawing, in which—

The figure is a vertical sectional view of a device embodying my invention.

The urn comprises an outer cylindrical casing 10 having a shell 11 within spaced from the walls thereof and secured to the upper portion by a flange 12, said shell so inclosing the casing as to form the latter into a boiler adapted to contain water in the lower portion, which water is supplied through a valved service pipe 13 and heated by a burner 14. Received within the shell is a thick walled earthenware vessel 15 with an air space 15ª between, said vessel being for the purpose of containing the beverage. Supported upon the open top of the vessel is a stepped ring 16 which spans the space between the vessel and casing and also rests upon the top edge of the body of the casing. A cylindrical holder 17 rests upon the ring overlying the rim of the vessel and carries a percolator or strainer 18 suspended from the upper edge thereof. A cover 19 for the casing rests upon the ring 16.

The percolator or strainer contains grounds of the beverage, such as tea or coffee, and hot water is admitted to the interior of the vessel by means of a vertically disposed pipe 20 having a lower open end immersed in the water in the boiler and passing through the flange 12 and ring 16 and terminating in a conical end 21. Received upon this conical end is a U-shaped nozzle 22 carrying at its free end a perforated bulb 23 positioned within the strainer 18 near the bottom thereof. A valve 20ª is provided for the pipe 20 above the flange 12 and is controlled from the exterior of the casing. When the valve is open and sufficient steam has been generated in the boiler water is raised thereby in the pipe 20 and discharged through the bulb 23 into the vessel 15. By reason of the connection between the pipe 20 and nozzle 22 the latter is easily detached when it is desired to remove the percolator.

It is necessary to circulate the liquid in the vessel 15 through the grounds in the percolator in order to prepare the beverage, and this is done by means of steam as will presently appear. The vessel 15 has a discharge vent at the bottom opening into a horizontally disposed pipe 24 by means of a screw plug 24ª. One end of the pipe 24 projects through the casing and is provided with a spigot 25 for drawing off the beverage and the other end terminates within the casing and is fitted with a T-shaped coupling member 26 from the upper branch of which leads a return pipe 27 extending vertically through the flange 12 and ring 16 and provided with a cone-shaped upper end 28 which detachably receives the flared end of a U-shaped nozzle 29. The opposite end of the nozzle overlies the strainer 18 and carries a perforated bulb 30 discharging on to a convex deflector 31 carried by the nozzle 22. The pipe 27 is preferably fitted with a valve 32 above the flange 12 controllable from the exterior of the casing.

The lower branch of the T 26 receives a jet nozzle 33 on the end of a U-joint carried by a vertically disposed pipe 34, which pipe projects upwardly through the flange 12 and returns by means of a U-shaped end 35. Above the flange the pipe 34 is fitted with a valve 36 controllable from the exterior of the casing. The last described pipe forms a conduit for the steam generated in the boiler, and when the valve 36 is open steam is conveyed to the beverage return pipe for the purpose of circulating the beverage through the container and percolator. Steam is discharged from the jet nozzle 33 into the coupling member 26 which latter is below the vessel 15 and consequently filled with liquid. Thereupon the liquid is raised in the return pipe 27 and discharged through the sprinkling bulb 30 to the deflector 31, thence percolating through the grounds in the strainer 18 and back to the interior of the vessel. This operation continues until the beverage reaches the desired strength whereupon the valve 36 is closed to cut off the influence of the steam.

A water gage 37 is provided for the boiler and a beverage gage 38 for the vessel 15. A safety or escape valve 39 is fitted into the upper part of the boiler.

In operation the service pipe 13 should be connected with a cold water supply and water admitted to the boiler to the amount required as shown by the gage 37. The water is then heated until the valve 39 steams. Thereupon the valve 20ª is opened to permit the hot water to run over into the vessel 15. The valve 20ª is then closed and the valve 36 opened to cause the liquid to be circulated through the container 15 and strainer 18. The liquid in the vessel 15 may be run through the beverage grounds in this manner as long as desired.

The earthern-ware vessel 15 will have the effect of keeping the coffee hot for several hours after the heat has been turned off. Cleaning of the urn is accomplished by filling the vessel 15 with a cleansing fluid and running it through the connections in the manner already described. The parts are easily removable and replaceable as will readily be seen.

In order that too much water may not be admitted to the interior of the casing 10 I provide for automatically cutting off the supply of water through the service pipe 13 by means of a valve 40 connected to and operated by a float 41 carried within the casing. The valve is here shown open in the act of filling the boiler. It is obvious that the float will rise with the water and thereby shut the valve when the desired quantity has flowed into the boiler.

By the provision of the deflector 31, within the strainer below the top thereof and covering a wide area therein, the beverage is effectually prevented from overflowing in boiling.

Having thus described my invention what I claim and desire to secure by Letters Patent is:

1. A beverage urn comprising a boiler provided at its upper end with an upwardly extending rim, a beverage container within the boiler and carrying a percolator at its top, a vertically disposed pipe having a lower open end immersed in the water in said boiler and passing upwardly through the end of the boiler and terminating in a cone-shaped open end, a nozzle detachably fitted on said cone-shaped end and extending into the percolator whereupon water in said boiler under the pressure of steam will be passed into the container, a valve-controlled circulating pipe for the liquid in said container communicating with the container at the bottom thereof and having a vertically extending portion projecting upwardly through the end of the boiler and terminating in a cone-shaped open end on the opposite side of the beverage container from the first cone-shaped pipe end, a nozzle detachably fitted on said cone-shaped end for discharging into the percolator, means for conveying steam from said boiler into the return pipe for circulating the liquid therein, and a stepped ring supported at its inner edge by the container and at its outer edge by the rim, said pipes passing upwardly through the ring with their cone-shaped ends engaging over the latter to hold it seated on the container and rim.

2. A beverage urn comprising a boiler, a beverage container within the same and carrying a percolator at its top, a vertically disposed pipe having a lower open end immersed in the water in said boiler and passing upwardly through the end of the boiler and terminating in a cone-shaped open end, a nozzle detachably fitted on said cone-shaped end and extending into the percolator whereupon water in said boiler under the pressure of steam will be passed into the container, a valve-controlled circulating pipe for the liquid in said container communicating with the container at the bottom thereof and having a vertically extending portion projecting upwardly through the end of the boiler and terminating in a cone-shaped open end, a nozzle detachably fitted on said cone-shaped end and extending into the percolator, means for conveying steam from said boiler into the return pipe for circulating the liquid therein, the nozzle on said water supply pipe extending to a point near the bottom of the percolator and carrying a deflector upon which the nozzle of the return pipe discharges.

3. A beverage urn comprising an outer casing, a shell within the same and spaced therefrom and having a flanged upper end closing the upper end of the casing whereby to form a boiler within, an open top earthen-ware vessel supported within the shell, a discharge pipe for the vessel carried below the shell within the boiler and a screw-threaded connection for putting the vessel in communication with said discharge pipe, a stepped ring supported at its inner edge by the earthen-ware vessel and at its outer edge by the upper edge of the outer casing, a cylindrical holder seating on the ring, and a percolator suspended from the upper edge of the holder down into the earthen-ware vessel.

4. In an urn, a beverage container, a boiler, a pipe to convey heated water from the boiler to the beverage container, said pipe entering the beverage container at the top thereof and discharging below the top of the same, a deflector carried by said pipe within the beverage container for preventing the overflowing of the beverage when the latter is ebulliating, and a pipe extending from the lower portion of the beverage container to the top thereof for circulating the beverage through the container, said last mentioned pipe discharging onto the deflector.

In testimony whereof I have hereunto set my hand in the presence of two subscribing witnesses.

OTIS A. KITTINGER.

Witnesses:
BELLE ARCHIBALD,
CHAS. A. GRAY.